United States Patent [19]
Cam et al.

[11] Patent Number: 5,875,192
[45] Date of Patent: Feb. 23, 1999

[54] ATM INVERSE MULTIPLEXING SYSTEM

[75] Inventors: Richard Cam; Steven Lang, both of Vancouver; Charles Kevin Huscroft, Port Moody, all of Canada

[73] Assignee: PMC-Sierra Ltd., Burnaby, Canada

[21] Appl. No.: 764,490

[22] Filed: Dec. 12, 1996

[51] Int. Cl.$^6$ ............................................. H04J 3/02
[52] U.S. Cl. ..................... 370/474; 370/395; 370/535; 370/389
[58] Field of Search ..................... 370/395, 412, 370/389, 535, 536, 537, 562, 398, 469, 394

[56] References Cited

U.S. PATENT DOCUMENTS

| | | | |
|---|---|---|---|
| 5,606,558 | 2/1997 | Daniel et al. | 370/395 |
| 5,608,733 | 3/1997 | Vallee et al. | 370/394 |
| 5,761,191 | 6/1998 | VanDervort et al. | 370/395 |

*Primary Examiner*—Jason Chan
*Assistant Examiner*—Ahmad Fatayer
*Attorney, Agent, or Firm*—Baker & McKenzie

[57] ABSTRACT

An ATM inverse multiplexing cell-based system for reducing error-multiplication due to error events in the transmitted cell stream, which includes a first IMA assembly having an input coupled to an incoming cell stream from a first ATM layer device, a second IMA assembly having an output coupled to a second ATM layer device, a plurality of links coupling the first IMA assembly to the second IMA assembly. The first IMA assembly includes a multiplexer for multiplexing the incoming cell stream onto the plurality of links and for inserting onto the links framing cells in the form of "st" cells in place of idle cells and "S" cells to mark divisions in each channel corresponding to a given number of cells or a given time interval between successive "S" cells. An encoder encodes and inserts cell location information of both control cells and payload cells. The second IMA assembly includes a plurality of link buffers for receiving cells transmitted along respective ones of links. A demultiplexer demultiplexes cells by aligning "S" cells on the link buffers and releasing payload cells for CDV smoothing. A decoder extracts and decodes location information from the framing cells to identify errored or missing cells and to mark the location of those cells. A discriminator distinguishes between errors in a header and errors in a payload of an errored cell and flushes all cells in the same frame on each link upon failure to identify an "unknown" cell before encountering buffer overflow.

10 Claims, 7 Drawing Sheets

ATM INVERSE MULTIPLEXING SYSTEM

FIELD

The present invention relates to a cell-based ATM Inverse Multiplexing System which reduces the incidence of error-multiplication due to error events in the transmitted cell stream.

BACKGROUND

Figure 1:
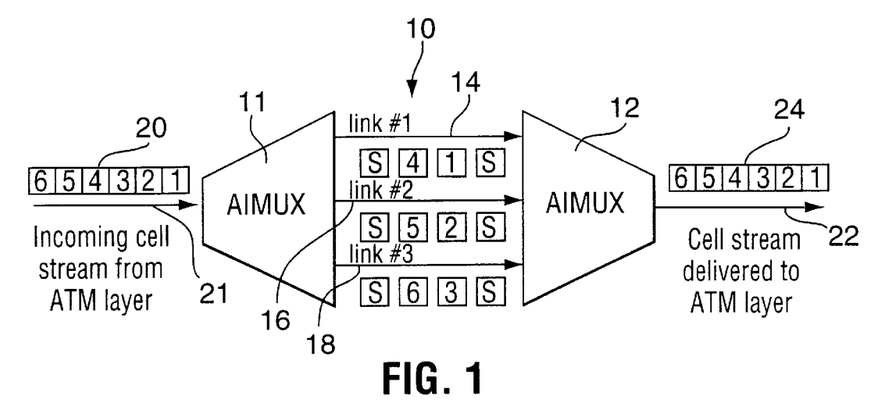
FIG. 1 is a schematic diagram of an IMA system with three links demonstrating the round-robin transmission of ATM cells.

In an ATM Inverse Multiplexing System (formerly referred to as AIMUX but presently referred to as IMA, for Inverse Multiplexing for ATM), ATM cell traffic is transported by means of time-division multiplexing over several channels (typically T1 or E1 data links). In a cell based IMA system, these ATM cells (defined here as "payload cells") are sent on each channel in a round-robin fashion as depicted in FIG. 1. In FIG. 1, an incoming cell stream 20 from an ATM layer on bus interface 21 is received by IMA device 11 of IMA system 10 and is coupled to another IMA device 12 by three channels or links 14, 16, and 18. Incoming cells 20 on incoming bus interface 21 enter the IMA device 11 and are time-division multiplexed over links 14, 16, and 18. In each channel or link 14, 16, or 18, a sequence number "S" cell is inserted periodically, as determined by a specified time interval or by a given number of cells. In this case an "S" cell precedes each series of cells from the incoming cell stream over a selected time interval or for each of a selected number of incoming cells. Another "S" cell is inserted on each channel after the last cells of the given set of cells in the incoming cell stream has been transmitted. At the IMA device 12, the egress payload cell stream is reconstructed by assembling incoming cells on each channel in the same order as they were transmitted.

Figure 2:
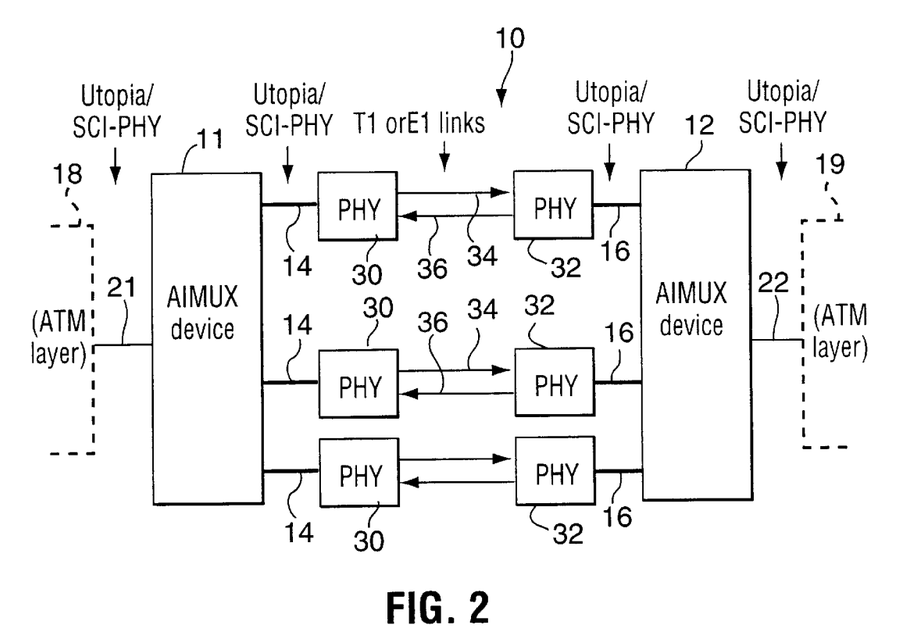
FIG. 2 is a more detailed block diagram of the system of FIG. 1.

A more specific configuration is shown in FIG. 2, in which one ATM Layer Device 18 is coupled through an IMA system 10 to another ATM Layer Device 19. The ATM Layer Device 18 connects to IMA device 11 via Utopia/SCI-PHY bus interface 21 which, in turn, is coupled to a number of physical layer devices 30 by Utopia/SCI-PHY bus interface 14. Each physical layer (PHY-layer) device 30 is coupled by links 34 and 36 to another corresponding physical layer device 32. Each physical layer device 32 is connected to IMA device 12 by one of several Utopia/SCI-PHY bus interface 16. IMA device 12 connects to ATM Layer device 19 by Utopia/SCI-PHY bus line 22.

Cells from ATM Layer Device 18 are sent to IMA device 11 which multiplexes them together with "S" cells, onto bus lines 14. A transmitting PHY-layer ATM device 30 sends idle cells over its link for the purpose of cell rate decoupling whenever its transmit FIFO buffer (not shown) is empty. This can occur when the incoming ATM traffic is either bursty or if the cells arrive at a rate slower than the transmit rate of the PHY device 30.

Figure 3:
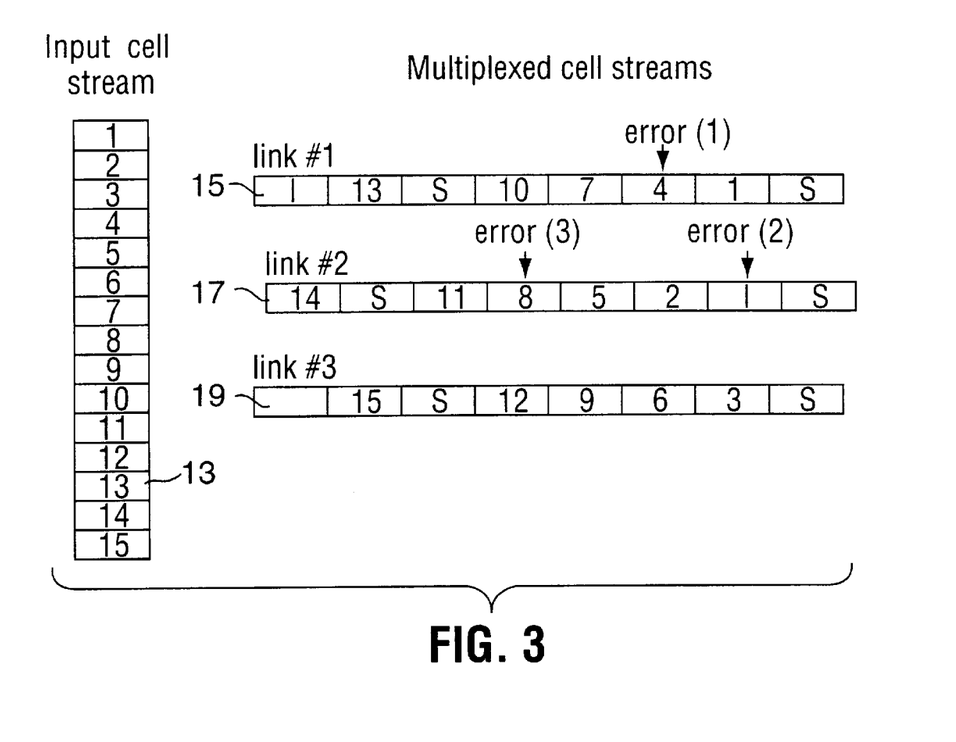
FIG. 3 is a schematic diagram of input and multiplexed cell streams with sample locations of HEC-errored cells.
Figure 4:
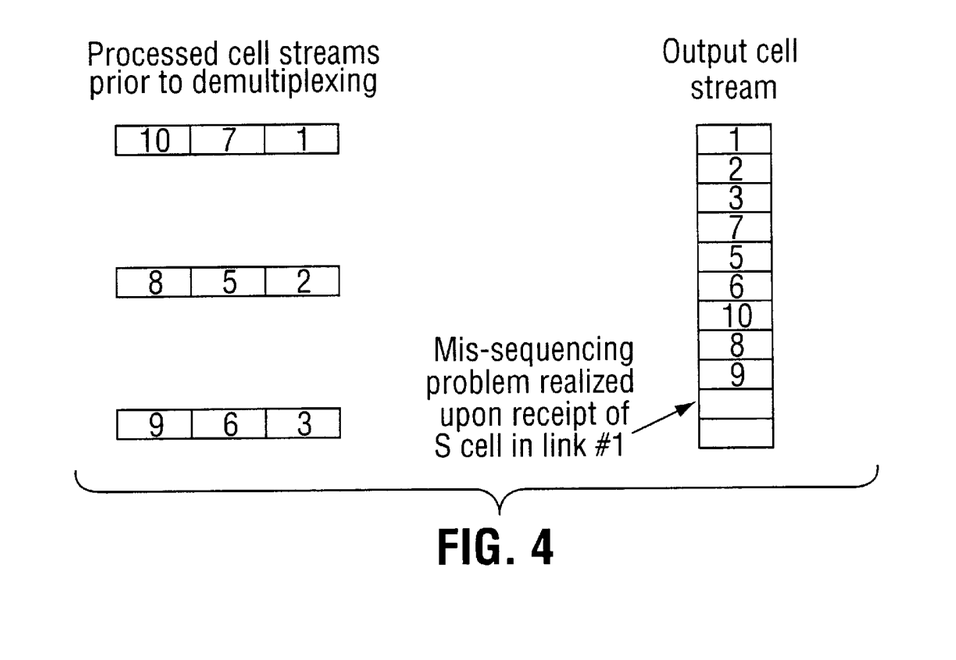
FIG. 4 is a schematic diagram of the occurrence of error multiplication corresponding to event error(1) of FIG. 3.

The receiving IMA device 12 must reconstruct its output stream from cells received over the constituent channels, in such a way that cell sequence integrity is preserved. Referring to FIG. 3, an input cell stream 13 is multiplexed over three links 15 (link #1), 17 (link #2), and 19 (link #3). An S cell precedes cell #1 followed by cell #1. Similarly, an S cell precedes cell #2 followed by an idle cell containing an error (error(2)) and an S cell on link 19 is followed by cell #3. The remaining cells are sent in the order shown in FIG. 3 with cells #4 and #8 containing errors (error(1) and error(3), respectively). Suppose a payload (or S) cell is lost due to an HEC error, as shown in FIG. 3 (event error (1)). If the cells are simply reassembled directly according to the successfully received payload cell sequence in each channel or link, then the output cells will no longer be delivered in the correct sequence to the ATM-layer device 12, as can be seen in FIG. 4. These errors will not be detected until an S cell is subsequently received (error-free), at which point the IMA device will realize the problem because the number of payload cells received between that and the previous S cell will be different from what is expected.

It will be seen that mis-sequencing occurs from a combination of 1)idle cells inserted in a manner that disrupts the ordered arrival sequence of payload cells and, 2) ambiguities as to where these idle cells may be in the received cell stream (and guessing wrong). These are consequences of using channels that operate in an asynchronous manner, where each channel may be operating at slightly (but nevertheless significantly) different frequencies and phase differences relative to the other channels at any given time. The mis-sequencing problem can be solved by having the channels operate synchronously with each other, but that may not always be feasible as it depends very much on the underlying telephone network infrastructure.

Figure 5:
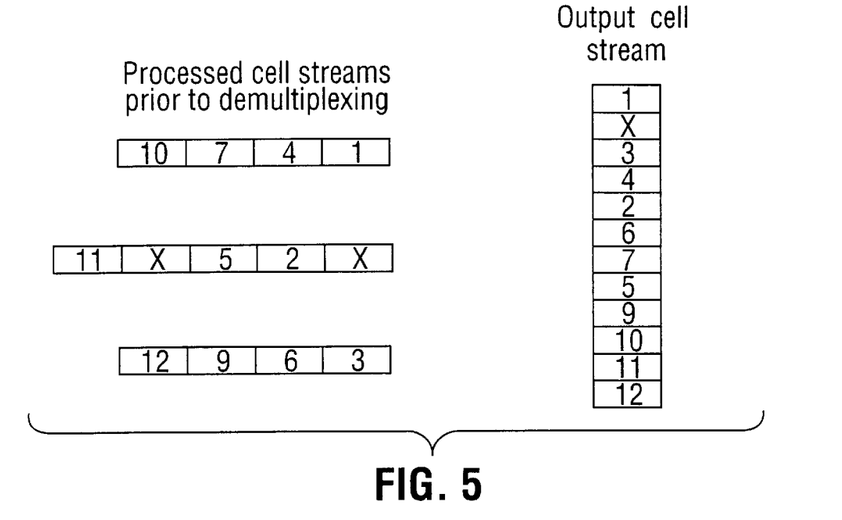
FIG. 5 is a schematic diagram of an error multiplication event corresponding to a combination of error(2) and error (3) of FIG. 3 (for the case of buffering with information about HEC-errored cells and cell arrival times)

ATM PHY devices 32 are typically configured to discard idle cells and cells with HEC errors. If these devices can be programmed to pass HEC-errored cells on to the higher layers, additional information can be used to assist in the decoding process (see ATMF 95-1659, "Synchronous Links, Cell Loss Handling, and Control Cells in AIMUX", December 1995). However, the IMA device 12 will still need to guess whether or not a HEC-errored cell corresponds to an idle cell. Now suppose that the number of payload cells framed between two S cells is fixed. The IMA device 12 can now use this information to identify errored cells by buffering all subsequently received cells for the remainder of the frame, and count the number of payload cells (see ATMF 95-1659, supra.). If the number of payload cells is less than expected, then it may be possible to determine the position of any missing payload cell by determining the locations of the HEC-errored cells. Furthermore, cell arrival timing information can be used to reduce the range of possibilities. This can be done by either explicitly recording the arrival times or by having the PHY devices pass idle cells through. Even if all these measures are taken, certain error patterns can produce unresolved ambiguities that lead to error multiplication. An example is shown in FIG. 3 for events error (2) and error (3), where the corresponding decoded sequence is shown in FIG. 5. Moreover, buffering schemes such as this one will not work if the number of payload cells in a given frame is unknown.

Accordingly, it is an object of the invention to provide a more robust solution to reduce error multiplication, as compared to the known schemes. It is a further object of the invention to provide error free multiplication which does not require additional PHY-layer signaling information from known schemes which work over asynchronous multiplexed channels. It is yet a further object of the invention to provide a solution to reduce error multiplication with no additional transmission overhead compared to existing schemes and which does not require an inordinate increase in implementation complexity or memory requirement.

SUMMARY OF THE INVENTION

According to the invention there is provided an ATM inverse multiplexing cell-based system for reducing error-multiplication due to error events in the transmitted cell stream, which includes a first IMA assembly having an input coupled to an incoming cell stream from a first ATM layer device, a second IMA assembly having an output coupled to a second ATM layer device, a plurality of links coupling the first IMA assembly to the second IMA assembly. The first IMA assembly includes a means for multiplexing the incoming cell stream onto the plurality of links and for inserting onto the links framing cells in the form of "st" cells in place of idle cells and "S" cells to mark divisions in each channel corresponding to a given number of cells or a given time interval between successive "S" cells. A means for encoding and inserting cell location information of both control cells and payload cells for a window of time into the past for each link into the framing cells. The second IMA assembly includes a plurality of link buffers for receiving cells transmitted along respective ones of links. A means for demultiplexing cells on the link buffers by aligning "S" cells on the link buffers and releasing payload cells so as to keep the link buffers partially filled as much of the time as possible. A means for decoding extracts and decodes location information from the framing cells to identify errored or missing cells and to mark the location of those cells. A means for distinguishing between errors in a header and errors in a payload of an errored cell and flushes all cells in the same frame on each link from the link buffers upon failure to identify an "unknown" cell or upon being blocked by another unresolved error.

The first IMA assembly may include a first IMA device couplable at one end to a first ATM layer device. A plurality of first physical layer devices is coupled to another end of the first IMA device. A plurality of second physical layer devices are each coupled by a pair of links to corresponding ones of a plurality of first physical layer devices. A second IMA assembly is couplable at one end to a second ATM layer device and at another end to said plurality of second physical layer devices, with each of corresponding ones of the first and second physical layer devices having respective first and second link buffers.

Preferably the second link buffers are circular buffers each having a write pointer and a read pointer initially aligned and the means for demultiplexing includes a total cells counter and a payload cell counter wherein the write pointer is incremented upon storage of an incoming cell into an associated link buffer, the read pointer is incremented each time a cell is released from the buffer, the total cells counter is incremented each time the write pointer is incremented and decremented each time the read pointer is incremented. The payload cells counter is incremented or decremented each time a payload cell is stored or released, respectively.

Advantageously, the means for encoding and inserting cell location information encodes cell sequence fragments on each link such that some of the cell sequence fragments overlap on each link.

The means for encoding location information for cell sequence fragments may be transmitted in framing cells subsequent in time to the cell sequence fragments.

The means for distinguishing between errors in a header and errors in a payload of an errored cell includes means for calculating CRC-10 over octets 7 through 51 of the errored cell.

The means for monitoring a Transmit Cell Available signal from each of the first physical layer devices may be coupled to a transmit cell output of the first IMA device.

There may also be included means for transmitting redundant location information over a plurality of links.

The first IMA system may include means for encoding location information of cells coming after the framing cell.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

In the following description, the terminology and assumptions used are based largely on the baseline text described in ATMF 95-1121, R. Vallee, G. Wetzel, "Baseline text for ATM Inverse Multiplexing Specification", October 95 incorporated herein by reference. However, the scheme is flexible enough to accommodate proposed changes such as those indicated in ATMF 95-1144, "Potential Problems with Current AIMUX Baseline Text and Recommended Solutions", October 1995, as well as subsequent versions of the baseline text. In the following, a frame refers to a set of cells, on one channel, containing a sequence number (S) cell and all subsequent cells before the next S cell. Payload cells refer to ATM cell traffic to be transported over the IMA system, excluding additional cells inserted by the IMA system 10 itself.

The approach of this scheme is accomplished employing the following steps:

(1) Preventing the (arbitrary) insertion of idle cells at the transmit side of the IMA system independently of control by the transmitting side by having the IMA device insert stuff (st) cells (see ATMF 95-1684, R. Cam, "A Solution to the Error-Multiplication Problem for Cell-Based AIMUX Systems," December '95) for cell rate decoupling.

(2) Recording where stuff and S cells have been inserted in the multiplexed cell streams.

(3) Passing the location information for these cells on to the receiver side.

(4) Allowing the receiver to use this information to release the (error-free) payload cells in the correct sequence.

To prevent insertion of idle cells, the transmit FIFOs (not shown) of the PHY devices 30 and 32 must not be allowed to empty out since such an event would trigger transmission of idle cells. To meet this requirement, the IMA device 11 and 12 sends out operation and management type (OAM-type) stuff cells during intervals when idle cells would otherwise be generated for cell rate decoupling. In general, the IMA device 11 and 12 sends cells to the PHY devices 30 and 32 while monitoring the TCA (Transmit Cell Available) signal of each device such that their transmit FIFOs never overflow but always remain at least partially filled. Hence, the cell stream of each transmitting PHY device 30 can be characterized as in ATMF 95-1121, supra., along with stuff cells inserted when necessary for cell rate decoupling. Insertion of stuff cells forms only part of the solution since the receiving end may not be able to distinguish whether or not a cell received in error is a stuff cell. The next key step is to send detailed location information of stuff and control cells in the transmitted cell stream on to the receiving end.

For convenience, both stuff (st) and S cells are collectively referred to as framing cells. For all practical purposes st and S cells are essentially identical and differ primarily in the reason for their insertion. Each framing cell contains location information of both control and payload cells in a window of time into the past for each channel in the given link group, relative to the particular framing cell. The size of this window will of course depend on the space allocated to contain this information.

Looking at the present baseline text for cell-based IMA, it appears that octet 12–51 in each S cell, which are currently unused, can be allocated for the purpose of encoding framing cell location information. As an example, consider the simple case of straight binary coding without supplemental error protection, where a "0" indicates a data cell and a "1" indicates a framing cell. If all 40 bytes are used, then information for up to 40×8=320 cell slots can be stored.

Figure 6:
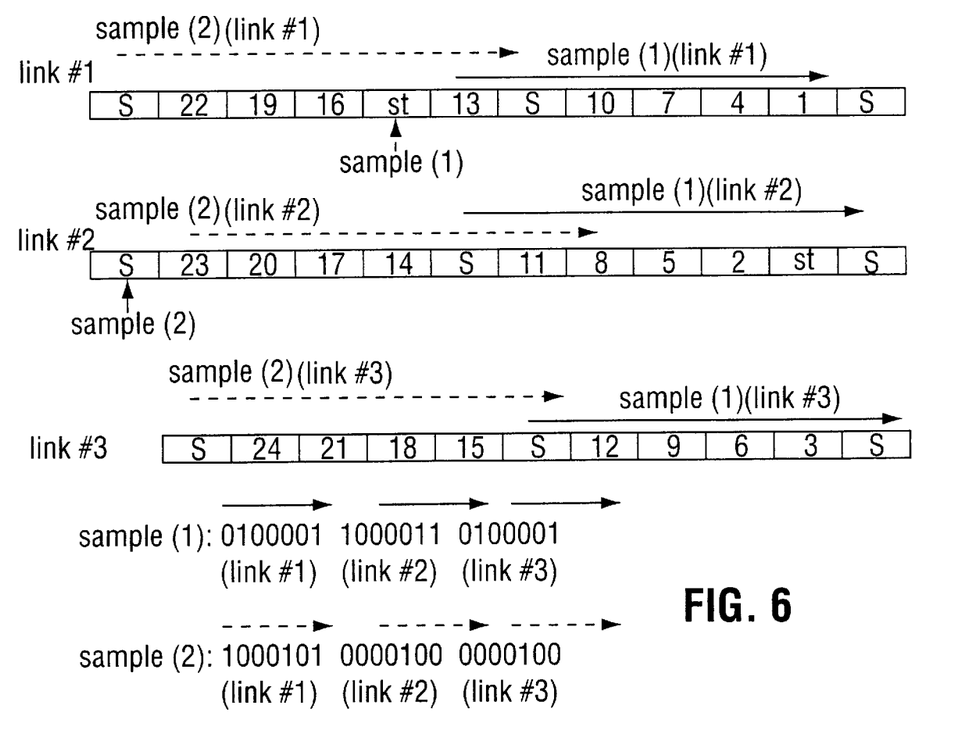
FIG. 6 is a schematic diagram of location information coding for sample cell sequence fragments.

Two sample encodings are shown in FIG. 6 for the given cell sequence fragment, assuming location information for the last 7 cells sent over each link. Suppose that the round-robin sequence among the links is 1, 2, 3, 1, 2, 3, . . . . In the case of sample (1), location information stored in the indicated stuff cell consists of the most recent 7-cell history encoding in link #1 (i.e., starting from payload cell 13), followed by link #2 starting from the S cell, and link #3 starting from payload cell 15. Hence, the complete encoding is formed by concatenating all three link-specific encodings in the order of links #1, 2 and 3 (i.e., "0100001", "1000011", and "0100001"). Note that the convention for concatenation is assumed to be in increasing numerical order starting from 1. For sample (2), it is assumed that payload cell 24 and an S cell were the last cells sent in links #3 and #1, respectively, prior to transmission of the indicated S cell. Hence, the complete encoding is the concatenation of "1000101", "0000100", and "0000100", corresponding to links 1 through 3. Since the number of links and the history interval for each link are set up ahead of time by the IMA protocol, there is no ambiguity as to how the link-specific information is to be extracted.

Note that the information in a given framing cell's window can partially overlap with those contained in one or more preceding (framing) cells. This is desirable since it results in additional redundancy in case framing cells are lost. Of course other schemes can be used to code the location information, including those in which there is no overlap.

It is still necessary to distinguish between stuff and S cells, since the payload cell stream is recovered by aligning the S cells at the receiver. This can be accomplished within the current S cell format by using any one of the unused bits in the TXCTRL field.

Figure 7:
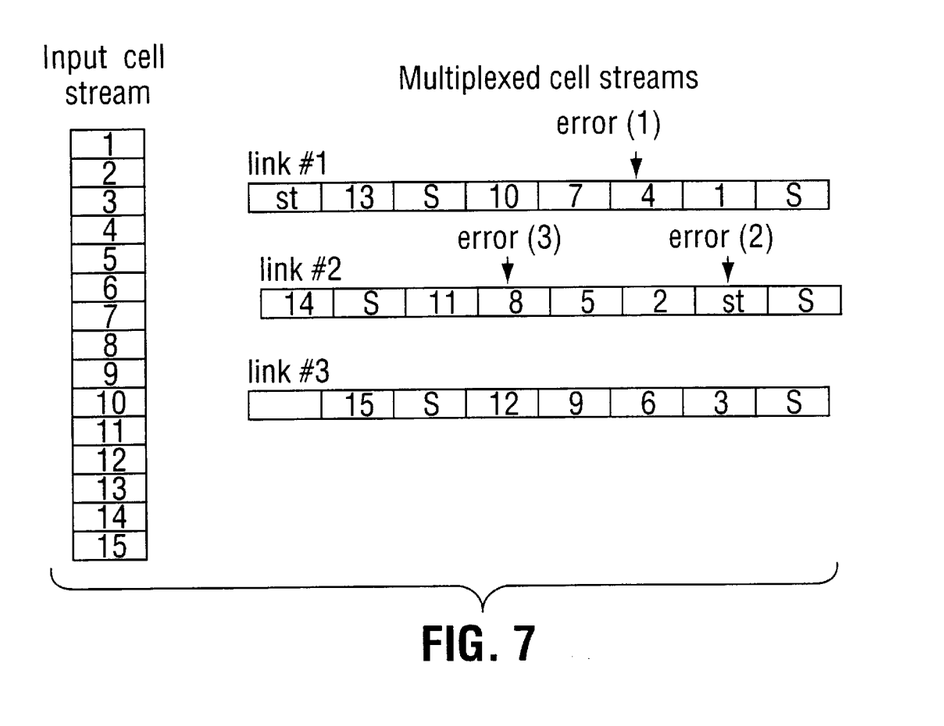
FIG. 7 is a schematic diagram of input and multiplexed cell streams with stuff cell insertion and sample locations of HEC-errored cells.
Figure 8:
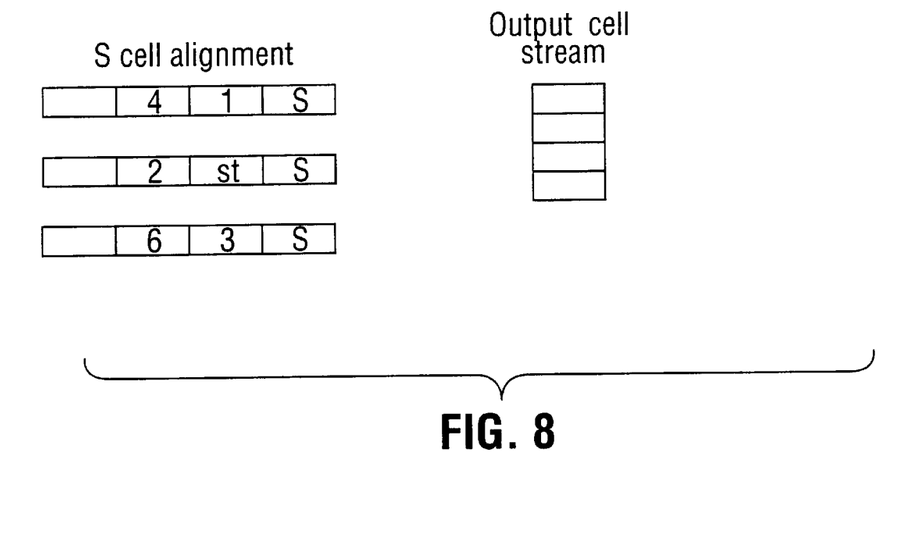
FIG. 8 is a schematic diagram of S cell alignment and initial buffering.
Figure 9:
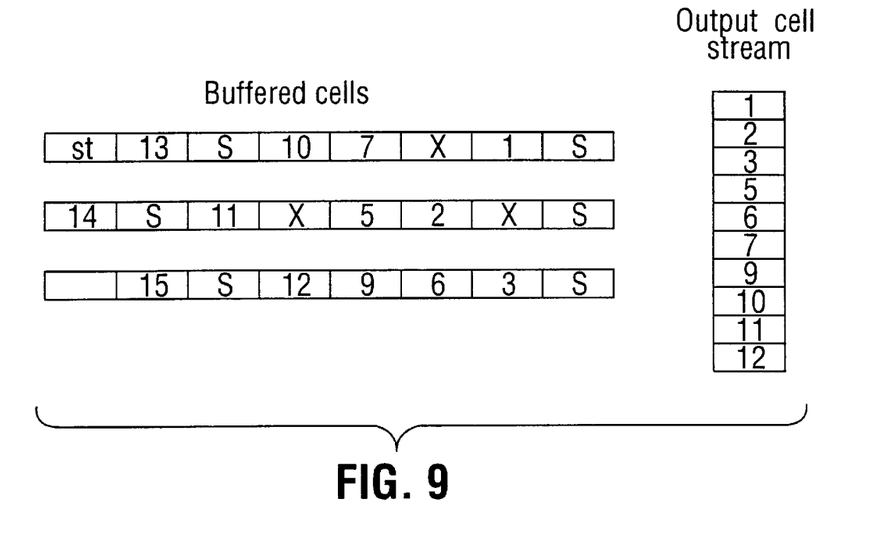
FIG. 9 is a schematic diagram showing the buffering and subsequent release of received cells.

Consider the cell streams in FIG. 7 with HEC error events occurring as shown. This is FIG. 3 redrawn to show stuff cells inserted in place of idle cells. At the receiving end, the IMA device 12 demultiplexes the cell streams by aligning the S cells and releasing the payload cells in such a way the buffer is kept partially filled as much of the time as possible (FIGS. 8 and 9). This is to reduce cell delay variation (CDV), though at the expense of additional cell transfer delay (CTD). When an errored cell is detected, the IMA device 12 will continue to buffer subsequent cell arrivals. Whenever a framing cell is received, the IMA device 12 examines the location information to determine which of the errored or missing cells correspond to payload cells. Payload cells can be released according to the demultiplexing sequence as well as traffic shaping requirements, so long as they are not preceded by an unresolved errored or missing cell. Missing or errored payload cells are replaced by a filler cell, or simply skipped over (FIG. 9). In either case, cell sequence integrity is preserved so long as a cell remains unresolved, subsequent cells in the same frame cannot be released.

One way to implement this buffering scheme is to allocate a fixed-size block of B cells for each channel in the link group, and to use each block as a circular buffer. Associated with each block are the following parameters:

(1) A write pointer 40 (see FIG. 10) that points to the location for storing the next buffered cell. This pointer is incremented each time after a cell is stored into the buffer.

Figure 10:
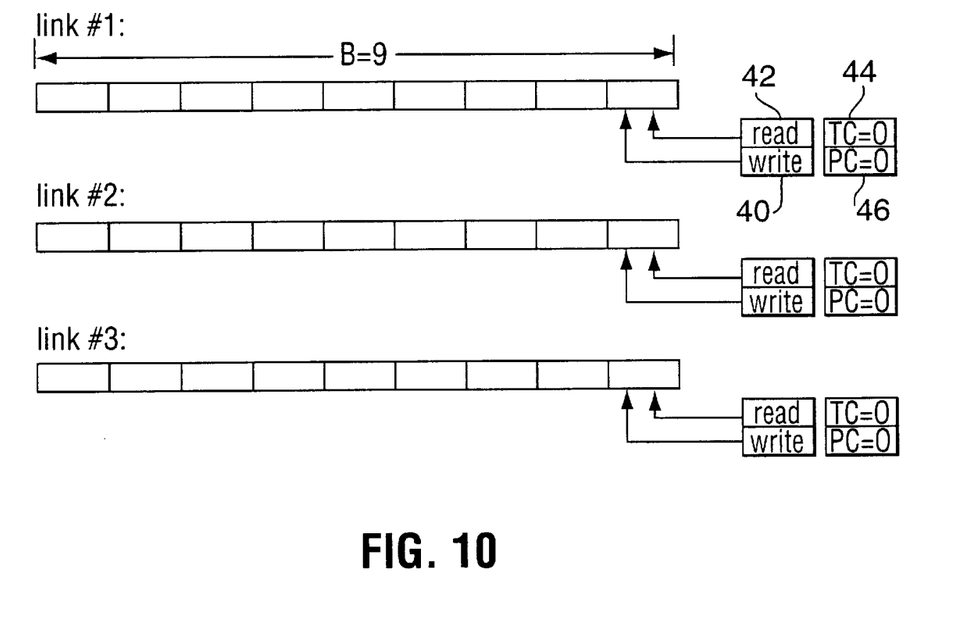
FIG. 10 is a schematic diagram of the initialized data structure of the link buffers.

(2) A read pointer 42 that points to the location of the oldest remaining cell stored in the buffer. It is initialized to point to the same location as the write pointer 40. This pointer 42 is incremented each time a cell is released from the buffer (as defined below).

(3) A total cells (TC) counter 44, initialized to zero, that is incremented or decremented each time the write 40 or read 42 pointer is incremented, respectively.

(4) A payload cells (PC) counter 46, initialized to zero, that is incremented or decremented each time a payload cell is stored or released, respectively. The PC counter 46 is also incremented each time an unresolved cell is identified (through the location information) as a payload cell. The diagram of this data structure is shown in FIG. 10 after initialization.

Figure 11:
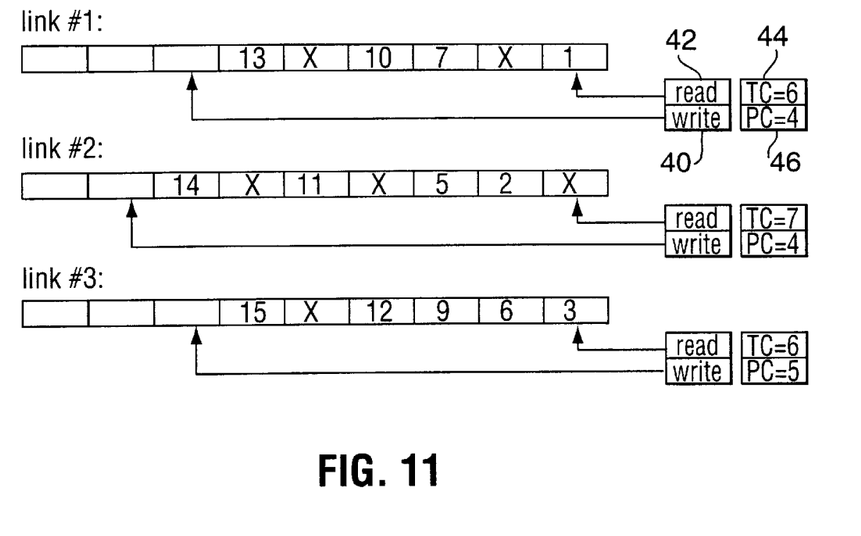
FIG. 11 is a schematic diagram of the status of the link buffers after arrival of several cells where X denotes errored or HEC-errored cells.
Figure 12:
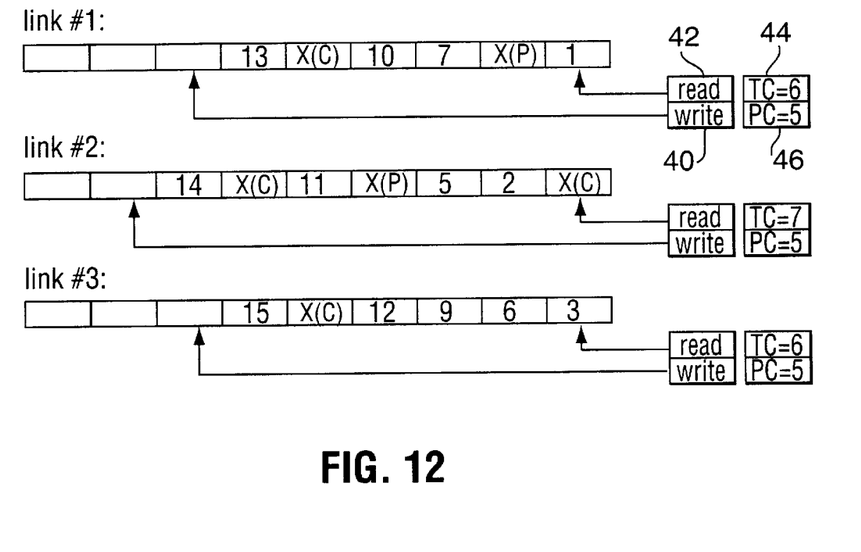
FIG. 12 is a schematic diagram of FIG. 11 after updating the link buffers after receipt of an st or S cell where X(C) and X(P) indicate identification of errored control and payload cells, respectively.

The IMA receiver 12 operates as follows. First, the read 42 and write 40 pointers, as well as the TC 44 and PC 46 counters are initialized as described above. These parameters change to reflect the buffer status as cells arrive (see FIG. 11 in which the sequence in FIG. 7 is used as an example). Initially, the IMA receiver 12 allows the buffer to fill before releasing cells at a point determined by the TC 44 and/or PC 46 counters of each channel. These counters are used in determining how cells are subsequently released so as to achieve the desired compromise between cell delay variation (CDV) and cell transfer delay (CTD). When a framing cell is successfully received, the location information is extracted to identify the errored or missing cells and to update the corresponding PC counters 46 (see FIG. 12).

Figure 13:
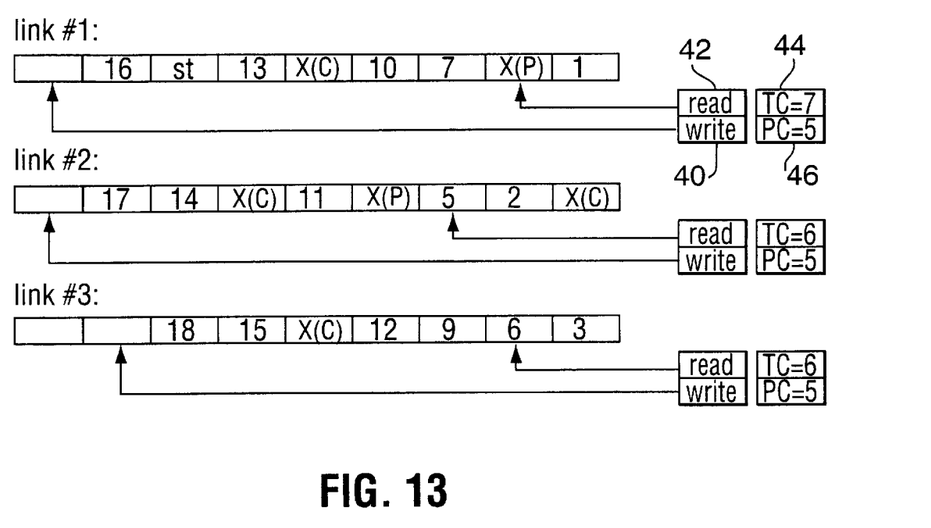
FIG. 13 is a schematic diagram showing the status of the link buffers, read and write pointers and TC and PC counters after arrival of new cells and release of buffered cells.

One way to mark these identified cells is to use some of the presently unused bits in the position of the transmit control (TXCTRL) field to indicate if the missing cell is "unknown", "errored payload" (i.e., st), or "errored control" (i.e., S). FIG. 13 shows a "snapshot" of the buffer as cells are written in and released.

Once (errored) framing cells have been identified, the location information contained in these cells may be used to identify cells received further back into the past. This is because the payloads of these cells may be error-free even though their headers are in error. In order to distinguish between errors in the header and the payload, one calculates the CRC-10 over octets 7 through 51 of a S (framing) cell. Alternatively, one can specify a separate coding scheme altogether for error detection and even error correction of the location information.

The receiver 12 releases cells according to the demultiplexing sequence until forced to pause upon encountering a link buffer that is either empty or blocked by an unresolved cell. Payload cells without errors are passed on to the ATM-layer device 19. An error-multiplication event occurs when a TC count exceeds buffer size B or when an "unknown" cell cannot be identified. This event should occur only very rarely, but when it does occur, all cells in the same frame in each channel are flushed from the buffers.

The above scheme is a preferred one for reducing the incidence of error multiplication. However, the location information may be encoded and stored in other IMA overhead cells which are sent to the receiving end. By this procedure the receiver can be assisted in correctly demultiplexing the payload cell stream (thus avoiding error multiplication) without requiring additional transmission bandwidth.

Using the above scheme, transmissions of location information transmitted over multiplexed bursty channels can be made less sensitive to error bursts by transmitting redundant information among other constituent channels. This approach is useful if bursts with high bit error rates tend to occur over a relatively long interval and if the bursts tend to be uncorrelated among the given channels. If bursts can render a given channel unusable for unacceptably long periods of time, then using other multiplexed channels (that tend not to be affected simultaneously) may be a better alternative to using more error protection coding or time diversity over a single channel.

One variation is to have the transmit side include the location information of cells coming after the stuff or sequence number cell containing the given location information. This could be done by using a buffer at the transmit side to temporarily hold the cells and generate the location information. Such a buffer may also be used (or required anyway) for traffic shaping purposes. Since the location information now pertains to cells arriving afterwards (i.e., in the future), a buffer will not be required at the receiver 12 for holding the cells prior to decoding location information (as in the above description), although some form of buffering may be needed for other purposes such as smoothing the released cell stream in order to reduce cell delay variation (CDV). At the receiver, a table for storing continually updated location information will still be needed, however.

Another variation has the transmit side encoding the location information of cells sent before and cells to be sent after the stuff or sequence number cell containing the given location information. This approach requires buffering at both the transmitter and receiver. The bi-directional nature of the location information may allow for some flexibility in provisioning transmit and receive buffers closer to sizes required for ancillary purposes such as traffic shaping and CDV smoothing. For example, rather than using the scheme described above with a receive buffer large enough to contain two frames for each link, an alternative design could use the variation here along with transmit and receive buffers that can each store one frame for each link. It may achieve a comparable level of robustness and may provide a closer match to the sizes required anyway for traffic shaping and CDV smoothing.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

We claim:

1. An ATM inverse multiplexing cell-based system for reducing error-multiplication due to error events in the transmitted cell stream, comprising:

(a) a first IMA assembly having an input coupled to an incoming cell stream from a first ATM layer device;

(b) a second IMA assembly having an output coupled to a second ATM layer device;

(c) a plurality of links coupling said first IMA assembly to said second IMA assembly;

wherein said first IMA assembly includes:

(1) means for multiplexing said incoming cell stream onto said plurality of links and for inserting onto said links framing cells in the form of "st" cells in place of idle cells and "S" cells to mark divisions in each channel corresponding to one of a given number of cells and a given time interval between successive "S" cells; and (2) means for encoding and inserting cell location information of both control cells and payload cells for a window of time into the past for each link into said framing cells;

wherein said second IMA assembly includes:

(3) a plurality of link buffers for receiving cells transmitted along respective ones of said links;

(4) means for demultiplexing cells on said link buffers by aligning "S" cells on said link buffers and releasing payload cells so as to keep said link buffers partially filled as much of the time as possible as required and to perform cell delay variation (CDV) smoothing;

(5) means for extracting and decoding location information from said framing cells to identify errored or missing cells and to mark the location of those cells;

(6) means for distinguishing between errors in a header and errors in a payload of an errored cell; and (7) means for flushing all cells in the same frame on each link from said link buffers upon failure to identify an "unknown" cell or upon being blocked by another unresolved error.

2. A system according to claim 1, wherein said first IMA assembly includes a first IMA device couplable at one end to a first ATM layer device, a plurality of first physical layer devices coupled to another end of said first IMA device, a plurality of second physical layer devices each coupled by a pair of links to corresponding ones of said plurality of first physical layer devices, a second IMA assembly couplable at one end to a second ATM layer device and at another end to said plurality of second physical layer devices, each of said first and second physical layer devices having respective first and second link buffers.

3. A system according to claim 2, wherein said second link buffers are circular buffers each having a write pointer and a read pointer initially aligned and said means for demultiplexing includes a total cells counter and a payload cell counter wherein said write pointer is incremented upon storage of an incoming cell into an associated link buffer, said read pointer is incremented each time a cell is released from said link buffer, the total cells counter is incremented each time the write pointer is incremented and decremented each time the read pointer is incremented, and the payload cell counter is incremented each time a payload cell is stored and decremented each time a payload cell released.

4. A system according to claim 1, wherein said means for encoding and inserting cell location information encodes cell sequence fragments on each link such that some of the cell sequence fragments overlap on each link.

5. A system according to claim 1, wherein encoding location information for cell sequence fragments is transmitted in framing cells subsequent in time to said cell sequence fragments.

6. A system according to claim 1, wherein said means for distinguishing between errors in a header and errors in a payload of an errored cell includes means for calculating CRC-10 over octets 7 through 51 of said errored cell.

7. A system according to claim 2, including means for monitoring a Transmit Cell Available signal from each of said first physical layer devices coupled to a transmit cell output of said first IMA device.

8. A system according to claim 1, including means for transmitting redundant location information over said plurality of links.

9. A system according to claim 1, wherein said first IMA assembly includes means for encoding location information of cells coming after the framing cell.

10. A system according to claim 1, wherein said first IMA assembly includes means for encoding location information of cells coming after and before said framing cells.

* * * * *